(12) United States Patent
Adachi

(10) Patent No.: US 7,061,687 B2
(45) Date of Patent: Jun. 13, 2006

(54) ZOOM LENS, AND ELECTRONIC APPARATUS USING THE SAME

(75) Inventor: Nobuyuki Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 10/897,007

(22) Filed: Jul. 23, 2004

(65) Prior Publication Data

US 2005/0046963 A1 Mar. 3, 2005

(30) Foreign Application Priority Data

Aug. 6, 2003 (JP) ............................. 2003-287295

(51) Int. Cl.
*G02B 15/14* (2006.01)
(52) U.S. Cl. ...................... 359/689; 359/686
(58) Field of Classification Search ................ 359/683, 359/686, 689
See application file for complete search history.

(56) References Cited

U.S. PATENT DOCUMENTS

| | | | |
|---|---|---|---|
| 5,059,006 A | | 10/1991 | Kikuchi et al. |
| 5,175,648 A | * | 12/1992 | Mori .......................... 359/689 |
| 5,274,504 A | * | 12/1993 | Itoh ............................ 359/676 |
| 5,305,148 A | * | 4/1994 | Ikemori et al. ............. 359/689 |
| 5,574,599 A | * | 11/1996 | Hoshi et al. ................ 359/689 |
| 5,644,434 A | * | 7/1997 | Hagimori .................... 359/689 |
| 5,999,329 A | | 12/1999 | Ohtake |
| 6,560,035 B1 | * | 5/2003 | Enomoto .................... 359/382 |

FOREIGN PATENT DOCUMENTS

EP  1 326 119  7/2003

OTHER PUBLICATIONS

Patent Abstracts of Japan, JP 2000-330024, Nov. 30, 2000.

* cited by examiner

*Primary Examiner*—Scott J. Sugarman
(74) *Attorney, Agent, or Firm*—Oblon, Spivak, McClelland, Maier & Neustadt, P.C.

(57) ABSTRACT

A zoom lens includes a negative first lens group G1 fixed during power variations, a positive second lens group G2 moving from an image side toward the object side from the wide-angle end toward the telescopic end during power variations, and a negative third lens group G3 moving on the optical axis during power variations in this order from an object side. The third lens group G3 is provided with a lens L31 serving as a front group, and a lens L32 arranged as a rear group with an air space interposed between this lens L31 and the lens L32. When f1 denotes the focal length of the first lens group G1, f2 denotes the focal length of the second lens group G2, and y denotes the diagonal length of an image pickup plane, Formulas $1.3<|f1/y|<3.6$, and $1.1<f2/y<2.0$ are satisfied.

6 Claims, 6 Drawing Sheets

ZOOM LENS, AND ELECTRONIC APPARATUS USING THE SAME

CROSS REFERENCE TO RELATED APPLICATION

This application claims priority from Japanese Priority Document No. 2003-287295, filed on Aug. 6, 2003 with the Japanese Patent Office, which document is hereby incorporated by reference.

BACKGROUND OF THE INVENTION

1. Field of the Invention

The present invention relates to a zoom lens having small size and good optical performance, and to an electronic apparatus using the same.

2. Description of the Related Art

In recent years, it has been demanded that small-sized camera modules for use in mobile telephones which are one type of electronic apparatus having a reduced thickness and optical zoom lenses. This type of zoom lens must be designed to take dropping impact into account, because of its portability in particular. Namely, if a lens suitable for this use is to be designed, it is necessary to take into account that a lens group positioned on the side closest to an object is designed not to move during zooming. In addition, it is also necessary to take into account that the lens is designed not to project outwardly from the body of a mobile telephone or the like.

As one construction which satisfies these conditions, for example, a construction can be considered, wherein a fixed lens having an non-power barrier is provided in front of a 2-group zoom lens made of positive and negative lens groups. It has also heretofore been proposed to provide a zoom lens which includes, in order from an object side, a first lens group having an negative refractive power, a second lens group having a positive refractive power, and a third lens group having an negative refractive power, and performs zooming while moving the second lens group and the third lens group with the first lens group fixed during the zooming (refer to, for example, Patent Document 1 and Patent Document 2).

Patent Document 1: Japanese Laid-Open Patent JPA 2000-330024

Patent Document 2: Japanese Laid-Open Patent JPA H10-513270

SUMMARY OF THE INVENTION

In the former construction, however, since the effective diameter of the barrier is large, a camera cannot be made compact in height and width. On the other hand, in the latter construction, not only its power variation ratio is as small as approximately 2 times, but also the distortion at the wide-angle end is large. In addition, there occurs the problem that if an image pickup element such as a CCD (Charge Coupled Device) is used, a lid glass for protecting the surface of the image pickup element becomes necessary, but the latter construction cannot satisfactorily ensure the back focus because of the lid glass.

The present invention has been made to solve these problems. Namely, the present invention provides a zoom lens including, a negative first lens group which is fixed during power variations, a positive second lens group which moves from an image side toward the object side from the wide-angle end toward the telescopic end during power variations, and a negative third lens group which moves on the optical axis during power variations in this order from an object side, wherein the third lens group is made of a front group and a rear group with an air space interposed between the front group and the rear group, and when f1 denotes the focal length of the first lens group, f2 denotes the focal length of the second lens group, and y denotes the diagonal length of an image pickup plane, the following conditional Formulas are satisfied:

$$1.3 < |f1/y_-| < 3.6 \quad (1)$$

$$1.1 < f2/y < 2.0 \quad (2)$$

Further, when f3 denotes the focal length of the third lens group, the following conditional Formula is satisfied:

$$1.6 < |f3/y| < 3.4 \quad (3)$$

Further, when f31 denotes the focal length of a lens positioned on the side closest to an object in the third lens group, the following conditional Formula is satisfied:

$$0.6 < |f31/f3| < 1.5 \quad (4)$$

In this invention, the conditional Formula (1) defines the focal length of the first lens group, thereby suppressing distortion while restraining an increase in the diameter of its front element. The conditional Formula (2) defines the focal length of the second lens group, thereby compatibly realizing correction of spherical and coma aberrations while reducing the amount of movement during power variations.

In addition, the conditional Formula (3) defines the focal length of the third lens group, thereby reducing the incident angle of an off-axis beams on the image pickup element while restraining an increase of the back focus. In addition, the conditional Formula (4) defines the focal length of the front group of the third lens group, thereby suppressing inward coma aberration which easily occurs between a 50% image height and a 100% image height in particular, and it is also possible to suppress the occurrence of outward coma aberration.

According to this invention, it is possible to provide a compact zoom lens in which even if the first lens group is fixed during zooming, its compactness is not impaired and the incident angle of off-axis rays on an image pickup element is gentle as well as its optical performance is high.

DESCRIPTION OF THE PREFERRED EMBODIMENTS

Figure 1:
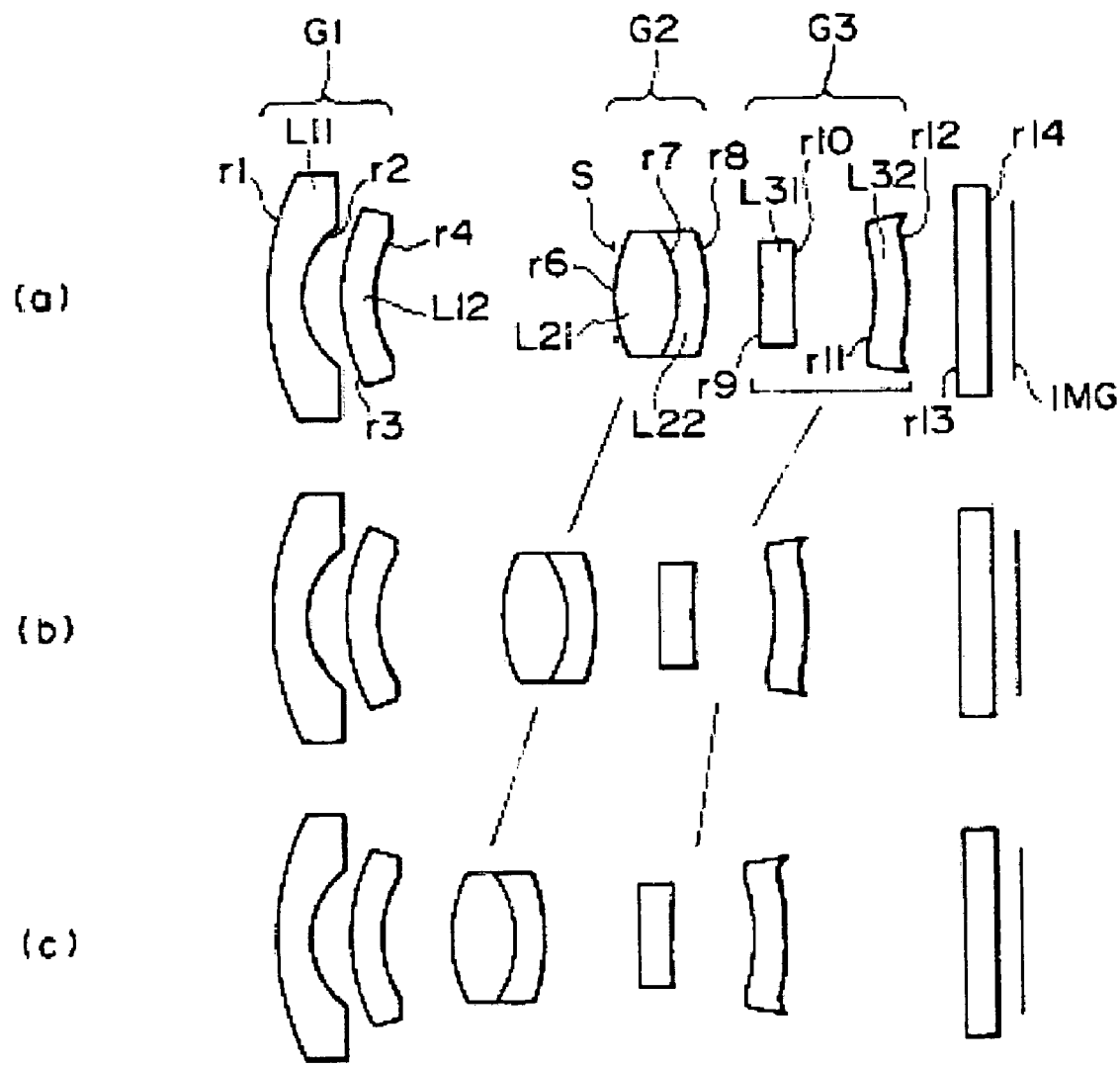
FIG. 1 is a schematic cross-sectional view showing a zoom lens according to the present mode.

A mode for carrying out the invention will be described below with reference to the accompanying drawings. FIG. 1 is a schematic cross-sectional view showing a zoom lens according to the present mode, and (a), (b) and (c) show the positions of its individual lenses at its short focal length end, its intermediate focal length, and its long focal length end, respectively.

Namely, the zoom lens according to the present mode includes, a negative first lens group G1 which is fixed during power variations, a positive second lens group G2 which moves from an image side toward the object side from the wide-angle end toward the telescopic end during power variations, and a negative third lens group G3 which moves on the optical axis during power variations in this order from an object side.

The third lens group G3 in this zoom lens is provided with a lens L31 which serves as a front group, and a lens L32 which is arranged as a rear group with an air space interposed between this lens L31 and the lens L32. When f1 denotes the focal length of the first lens group G1, f2 denotes the focal length of the second lens group G2, and y denotes the diagonal length of an image pickup plane, the following conditional Formulas are satisfied:

$$1.3 < |f1/y| < 3.6 \quad (1)$$

$$1.1 < f2/y < 2.0 \quad (2)$$

Further, when f3 denotes the focal length of the third lens group G3, the following conditional Formula is satisfied:

$$1.6 < |f3/y| < 3.4 \quad (3)$$

Further, when f31 denotes the focal length of the lens L31 positioned on the side closest to an object in the third lens group G3, the following conditional Formula is satisfied $$0.6 < |f31/f3| < 1.5 \quad (4)$$

In the zoom lens according to the present mode, the first lens group G1 is made of two elements. Of these two lenses L11 and L12, the lens L11 arranged on the object side is a glass spherical lens, while the lens L12 arranged on the image side is an aspherical lens. Namely, in the first lens group G1 of the zoom lens according to the present mode, the amount of refraction of off-axis main beams at the wide-angle end in particular is large, so that large astigmatism and distortion occur. For this reason, the aspherical lens is used as the lens L11 on the image side, to correct these aberrations.

Although, in the present mode, the first lens group G1 is made of the two lenses L11 and L12, the first lens group G1 may also be made of single concave lens. In this case, it is desirable to use an aspherical lens. In addition, a complex aspherical surface may also be provided on an image-side surface of the concave lens.

In the case where the first lens group G1 includes in combination the glass spherical lens and the aspherical lens, the material of the aspherical lens is preferably plastic in terms of cost merit. In this case, in consideration of variations in focus due to temperature variations, the focal length of the constituent lens desirably satisfies the following conditional Formula (5):

$$4 < |f12/fw| \quad (5)$$

f12: focal length of the lens arranged on the image side in the first lens group
fw: focal length at the wide-angle end By satisfying this conditional Formula, it is possible to suppress the amount of focus point shift due to temperature variations to a level which causes no problem in terms of practical use.

The conditional Formula (2) defines the focal length of the positive second lens group G2. If the upper limit of this conditional Formula is exceeded, the focal length becomes longer. Accordingly, by selecting the focal length so as not to exceed the upper limit, it is possible to reduce the amount of movement during power variations, whereby it is possible to make the zoom lens compact. On the other hand, if the lower limit is exceeded, the focal length becomes short. Accordingly, by selecting the focal length so as not to exceed the lower limit, it is possible to compatibly realize correction of spherical and coma aberrations in particular.

In the present mode, an aperture stop S is arranged in the second lens group on the side closest to the object so that the aperture stop S is made to move together with the second lens group G2 during power variations. The reason for this is that its exit pupil position can be made distant and the lens L11 which is the front element of the first lens group G1 can be made small in its diameter. In addition, since the incident angle of off-axis beams on an image pickup element IMG can be made as shallow as possible, shading can be suppressed to brightly illuminate the four corners of its image plane.

The second lens group G2 is formed as a cemented lens made of a biconvex lens L21 and a concave lens L22. This is intended to appropriately correct spherical aberration in the entire range of power variations. Incidentally, if a positive lens and a negative lens are independently arranged, spherical aberration is excessively under-corrected and is difficult to correct in other lens groups.

The glass material of each of the convex lens L21 and the concave lens L22 in the second lens group G2 is desirably selected to satisfy the condition of the following expression:

$$12 < |v21 - v22| \quad (6)$$

v21: Abbe's number of the convex lens L21 of the second lens group G2
v22: Abbe's number of the concave lens L22 of the second lens group G2

By setting the difference between the Abbe's numbers so as to satisfy this condition, it is possible to correct longitudinal chromatic aberration at the wide-angle end in particular.

The conditional Formula (3) defines the focal length of the negative third lens group G3. If the upper limit of this conditional Formula is exceeded, the focal length becomes longer. Accordingly, by selecting the focal length so as not to exceed the upper limit, it is possible to restrain an increase in the back focus, whereby it is possible to make the zoom lens compact. On the other hand, if the lower limit is exceeded, the focal length becomes shorter. Accordingly, by selecting the focal length so as not to exceed the lower limit, it is possible to make close its exit pupil position and reduce the incident angle of off-axis beams on the image pickup element IMG.

The conditional Formula (4) defines the focal length of the front-group lens L31 having negative power in the third lens group G3. If the upper limit of this conditional Formula is exceeded, the focal length becomes longer. Accordingly, by selecting the focal length so as not to exceed the upper limit, it is possible to suppress inward coma aberration which easily occurs between a 50% image height and a 100% image height in particular. On the other hand, if the lower limit is exceeded, the focal length becomes shorter.

Accordingly, by selecting the focal length so as not to exceed the lower limit, it is possible to suppress the occurrence of outward coma aberration.

In the present mode, the third lens group G3 is made of the two lenses L31 and L32. This results from the fact that the number of correction surfaces needs to be increased in order to appropriately correct curvature of field and astigmatism in particular. Namely, if the third lens group G3 is made of a single lens, it will be extremely difficult to reduce astigmatism as well as to eliminate curvature of field.

In the present mode, in the third lens group G3, the lens L31 lying on the image side is described as either of lenses having positive refractive power and negative refractive power, but its power may be designed to be either positive power or negative power, mainly when astigmatism and curvature of field are to be balanced.

In the present mode, the lens positioned on the side closest to an image is made of plastic. In the case of plastic, the following conditional Formula is desirably satisfied:

$$5 < |f32/fw| \qquad (7)$$

If this conditional Formula (7) is satisfied, it is possible to suppress the amount of focus position shift due to temperature variations to a level which causes no problem in terms of practical use.

Furthermore, an aspherical surface is preferably used for the constituent lenses of the third lens group G3. This is because the aspherical surface is preferable in terms of correction of off-axis aberrations.

In addition, since the third lens group G3 has negative power, the back focus can be reduced and the entire zoom lens can be reduced in size, but the incident angle to the image pick up element IMG is increased. In this case, the four corners of the image plane become slightly dark compared to the image-plane center, but if the present zoom lens is used in a small-sized electronic device such as a mobile telephone, since subjects are positioned in the image-plane center in many scenes, photography which highlights a subject in the image-plane center can be naturally performed. Incidentally, if the same level of brightness is to be obtained over the entire image plane, the image signals captured by the image pickup element IMG need only to be electrically processed.

Figure 2:
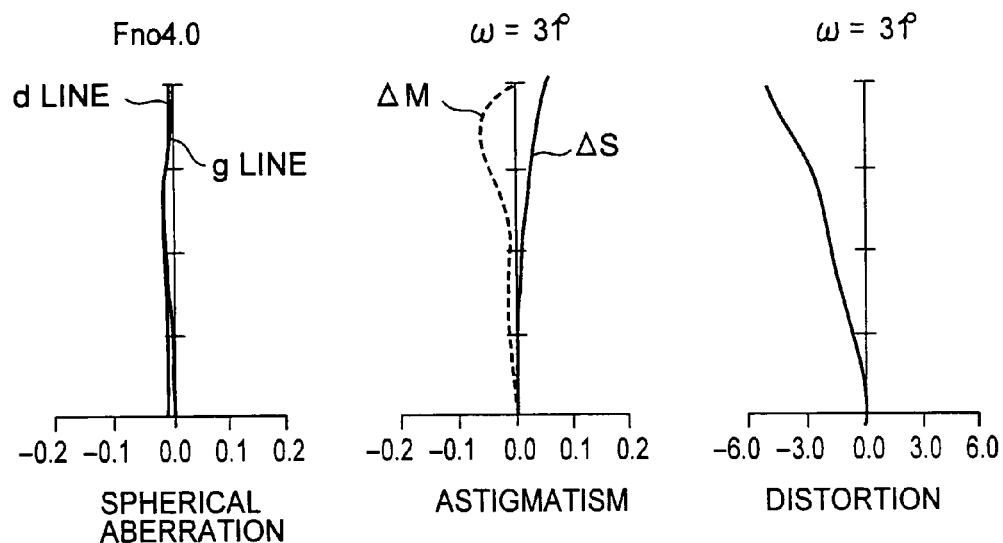
FIG. 2 is graphs of various aberrations at the short focal length end in a first embodiment.
Figure 3:
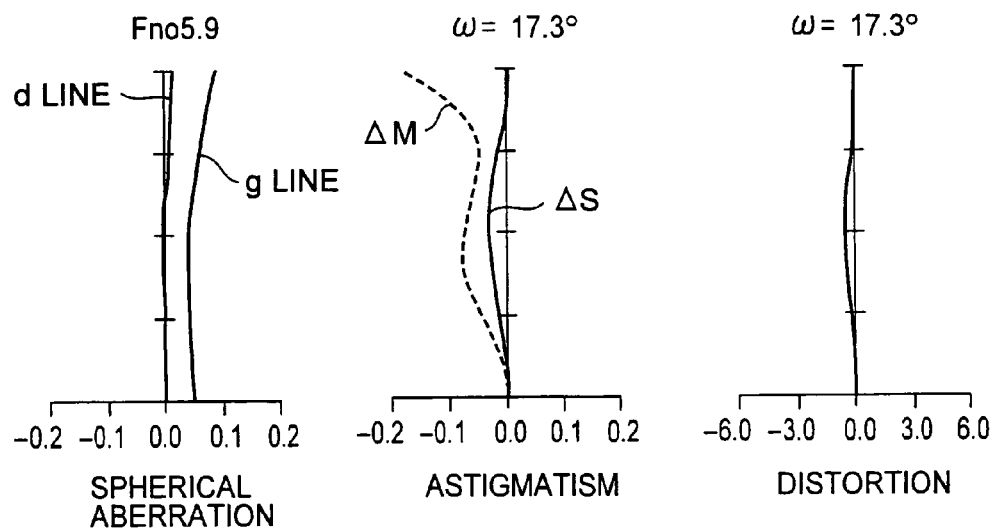
FIG. 3 is graphs of various aberrations at the intermediate focal length in the first embodiment 1.
Figure 4:
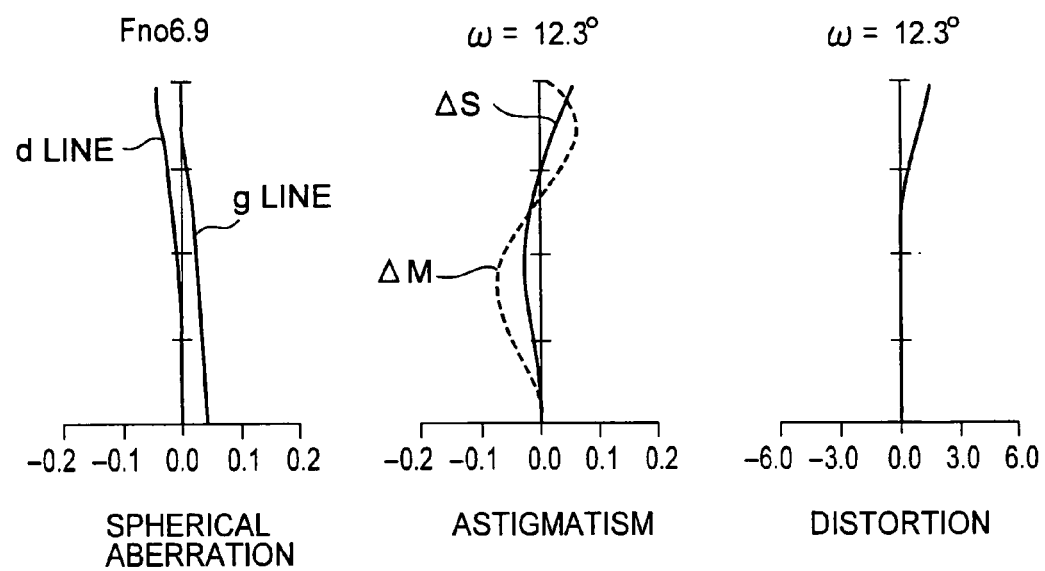
FIG. 4 is graphs of various aberrations at the long focal length end in the first embodiment 1.
Figure 5:
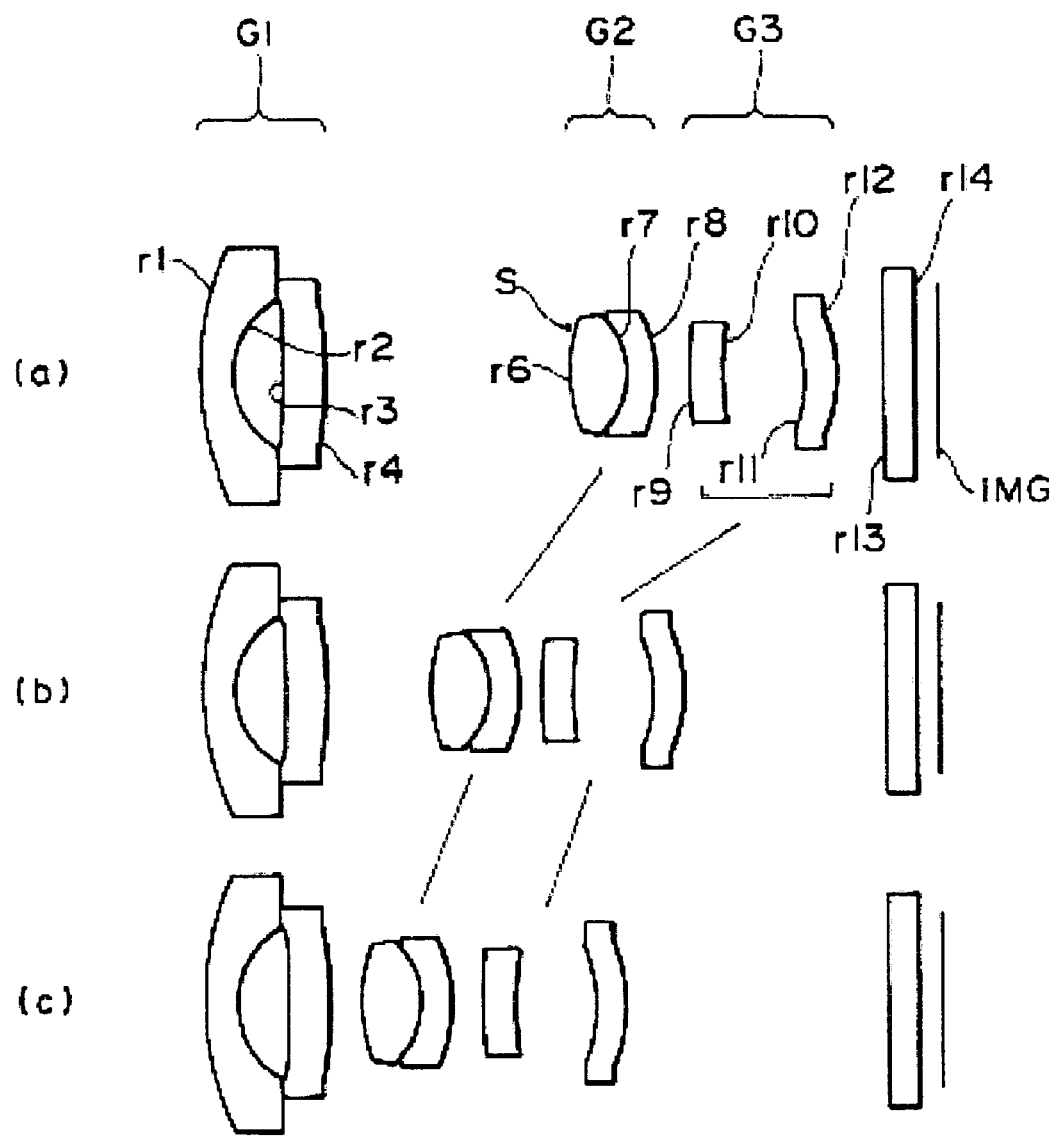
FIG. 5 is a schematic cross-sectional view showing the construction of a zoom lens according to a second embodiment.

A plurality of embodiments of the zoom lens according to the present mode will be described below. First, a first embodiment of the zoom lens according to the present invention will be described below with reference to FIGS. 2 to 4. The construction of the zoom lens according to this first embodiment is the same as the schematic cross-sectional view shown in FIG. 1. FIG. 2 shows graphs of various aberrations at the short focal length end in the first embodiment, FIG. 3 shows graphs of various aberrations at the intermediate focal length in the first embodiment, and FIG. 4 shows graphs of various aberrations at the long focal length end in the first embodiment.

Table 1 shows specific values in the lens of the first embodiment. The surface numbers shown in Table 1 respectively correspond to numbers r1 to r14 of the lens surfaces shown in FIG. 1, and R represents the radius of curvature of a lens surface, and D represents the space between adjacent two lens surfaces. N represents a refractive index relative to the d line, and Vd represents an Abbe's number.

TABLE 1

| SURFACE NUMBER | R | D | Nd | Vd |
|---|---|---|---|---|
| 1 | 4.636 | 0.5 | 1.5168 | 64.2 |
| 2 | 1.400 | 0.6 | | |
| 3 | 3.033 | 0.5 | 1.52996 | 55.9 |
| 4 | 1.852 | A | | |
| DIAPHRAGM | INFINITY | 0.17 | | |
| 6 | 2.178 | 0.97 | 1.6935 | 53.2 |
| 7 | −1.846 | 0.45 | 1.7552 | 27.5 |
| 8 | −3.157 | B | | |
| 9 | −4.373 | 0.5 | 1.82114 | 24.1 |
| 10 | 9.706 | 1.22 | | |
| 11 | −3.495 | 0.5 | 1.52996 | 55.9 |
| 12 | −4.623 | C | | |
| 13 | INFINITY | 0.5 | 1.5168 | 64.2 |
| 14 | INFINITY | 0.35 | | |

Of the above-listed values, D4, D8 and D12 are respectively shown by variables A, B and C, because the respective spaces vary with zooming. The values of the respective variables A, B and C of the first embodiment which are obtained when zooming from the wide-angle end to the telescopic end is performed are shown in Table 2. In Table 2, f presents the focal length of the entire system, and Fno. represents the F-number of the entire system.

TABLE 2

| f | A | B | C |
|---|---|---|---|
| 2.3 | 3.501 | 1.713 | 0.867 |
| 4.5 | 0.792 | 0.992 | 1.46 |
| 6.44 | 0.75 | 2.338 | 2.716 |

It is assumed here that R3, R4, R6, R9, R10, R11 and R12 are respectively made of aspherical surfaces and each of the aspherical surfaces is defined by the following Expression:

$$x = \frac{\frac{h^2}{r}}{1 + \sqrt{1-(1+k)\frac{h^2}{r^2}}} + ah^4 + bh^6 + bh^8 + dh^{10}$$

In this Expression, x represents the coordinate of the aspherical surface in the direction of the optical axis, r represents the curvature, and h represents the distance from the optical axis. The aspherical coefficients a, b, c and d are shown in Table 3.

TABLE 3

| SURFACE NUMBER | K | a | b | c | d |
|---|---|---|---|---|---|
| 3 | 0 | 2.3522E−03 | −1.9542E−03 | 4.5872E−04 | −4.0448E−04 |
| 4 | −1.0040E+00 | 4.9833E−03 | −2.2764E−02 | 1.1914E−02 | −6.5788E−03 |

TABLE 3-continued

| SURFACE NUMBER | K | a | b | c | d |
|---|---|---|---|---|---|
| 6 | 8.9352E−01 | −2.4343E−02 | −1.1284E−02 | 3.6955E−03 | −3.8957E−03 |
| 9 | 0 | −3.7955E−02 | −4.5301E−02 | 3.9854E−01 | −3.5193E−01 |
| 10 | 0 | 4.0338E−03 | −6.8512E−02 | 5.0097E−01 | −3.2677E−01 |
| 11 | 0 | −7.5311E−03 | −1.3475E−01 | 1.9807E−01 | −3.2229E−02 |
| 12 | 0 | −2.7873E−02 | 2.4173E−02 | −4.7793E−02 | 4.1961E−02 |

In this first embodiment, it is possible to construct a zoom lens having an overall length of about 11 mm to 12 mm and an optical magnification of about 2 times.

Figure 6:
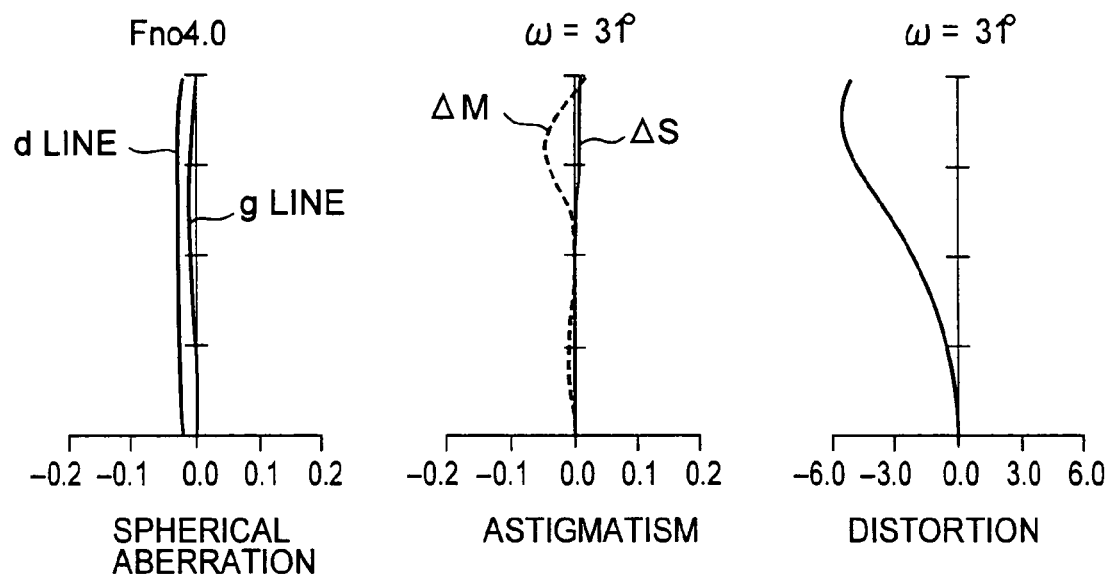
FIG. 6 is graphs of various aberrations at the short focal length end in the second embodiment.
Figure 7:
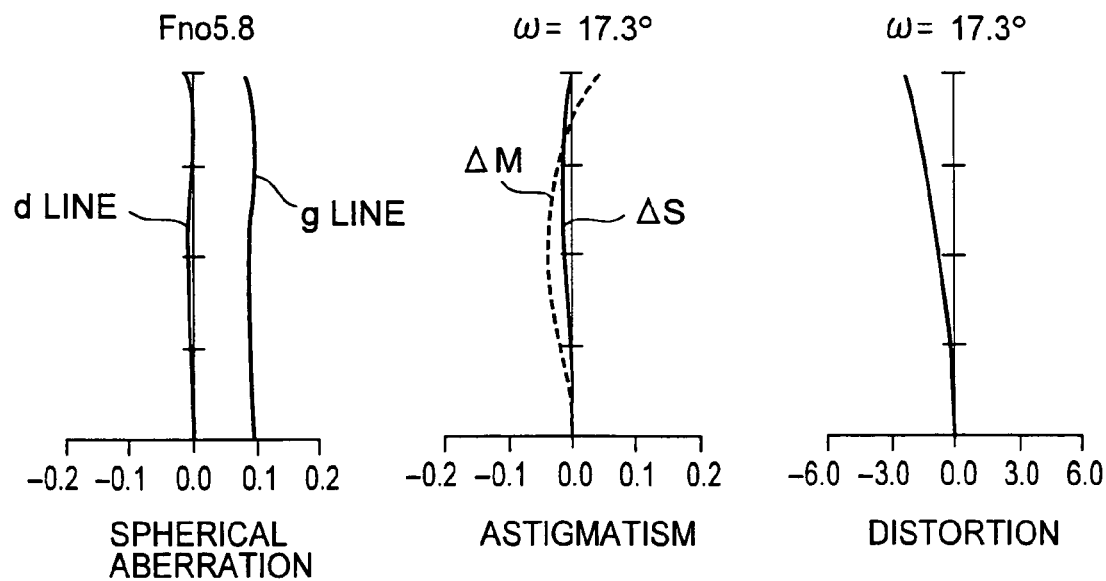
FIG. 7 is graphs of various aberrations at the intermediate focal length in the second embodiment.
Figure 8:
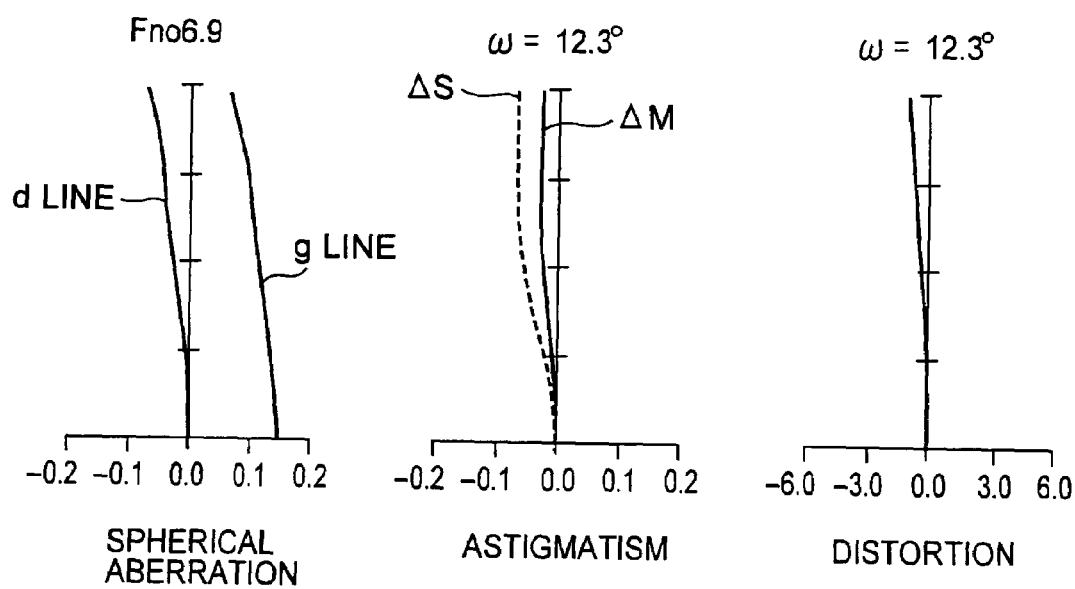
FIG. 8 is graphs of various aberrations at the long focal length end in the second embodiment.

A second embodiment will be described below. Referring to FIGS. 5 to 8, FIG. 5 is a schematic cross-sectional view showing the construction of a zoom lens according to the second embodiment, FIG. 6 shows graphs of various aberrations at the short focal length end in the second embodiment, FIG. 7 shows graphs of various aberrations at the intermediate focal length in the second embodiment, and FIG. 8 shows graphs of various aberrations at the long focal length end in the second embodiment.

Table 4 shows specific values in the lens of the second embodiment. The surface numbers shown in Table4respectively correspond to the numbers r1 to r14 of the lens surfaces shown in FIG. 5, and R represents the radius of curvature of a lens surface and D represents the space between adjacent two lens surfaces. N represents a refractive index relative to the d line, and Vd represents an Abbe's number.

TABLE 4

| SURFACE NUMBER | R | D | Nd | Vd |
|---|---|---|---|---|
| 1 | 5.031 | 0.5 | 1.487 | 70.4 |
| 2 | 1.400 | 0.8 | | |
| 3 | 147.904 | 0.624713 | 1.51386 | 56.4 |
| 4 | 32.489 | A | | |
| DIAPHRAGM | INFINITY | 0.170371 | | |
| 6 | 2.471 | 0.947441 | 1.6935 | 53.2 |
| 7 | −1.374 | 0.45 | 1.78541 | 39.2 |
| 8 | −2.662 | B | | |
| 9 | 23.745 | 0.5 | 1.82114 | 24.1 |
| 10 | 2.545 | 1.24006 | | |
| 11 | −3.977 | 0.50005 | 1.51386 | 56.4 |
| 12 | −4.000 | C | | |
| 13 | INFINITY | 0.5 | 1.5168 | 64.2 |
| 14 | INFINITY | 0.35 | | |

Of the above-listed values, D4, D8 and D12 are respectively shown by variables A, B and C, because the respective spaces vary with zooming. The values of the respective variables A, B and C of the second embodiment which are obtained when zooming from the wide-angle end to the telescopic end is performed are shown in Table 5. In Table 5, f represents the focal length of the entire system, and Fno. represents the F-number of the entire system.

TABLE 5

| f | A | B | C |
|---|---|---|---|
| 2.3 | 3.64 | 1.444 | 0.338 |
| 4.5 | 0.526 | 0.34 | 0.506 |
| 6.44 | 0.75 | 3.134 | 4.073 |

It is assumed here that R3, R4, R6, R9, R10, R11 and R12 are respectively made of aspherical surfaces and each of the aspherical surfaces is defined by the above-mentioned Expression. The aspherical coefficients a, b, c and d shown in the Expression are shown in Table 6.

TABLE 6

| SURFACE NUMBER | K | a | b | c | d |
|---|---|---|---|---|---|
| 3 | 0 | −7.2013E−03 | −2.2554E−02 | 1.2307E−02 | −4.5309E−03 |
| 4 | −1.0040E+00 | −2.6277E−02 | −2.3169E−02 | 8.8560E−03 | −2.7069E−03 |
| 6 | 4.9702E−01 | −2.9441E−02 | 4.5549E−04 | −1.4524E−02 | 9.9400E−03 |
| 9 | 0 | 5.2450E−02 | −4.8536E−02 | 1.8524E−02 | −1.3847E−01 |
| 10 | 0 | 8.1500E−02 | −2.1606E−02 | 2.2104E−01 | −1.9621E−02 |
| 11 | 0 | −5.6342E−02 | −1.5751E−01 | 2.0427E−01 | 2.4562E−03 |
| 12 | 0 | −5.4820E−02 | −5.3104E−02 | 2.6962E−02 | 3.4146E−02 |

In this first embodiment, it is possible to construct a zoom lens having an overall length of about 11 mm to 12 mm and an optical magnification of about 2.4 times to 2.5 times.

Numerical examples of the conditional Formulas (1) to (7) of first and second embodiments are shown in Table 7.

TABLE 7

| CONDITIONAL EXPRESSION | EMBODIMENT 1 | EMBODIMENT 2 |
|---|---|---|
| (1) $1.3 < |f1/y| < 3.6$ | 1.9 | 2.8 |
| (2) $1.1 < f2/y < 2.0$ | 1.5 | 1.6 |
| (3) $1.6 < |f3/y| < 3.4$ | 2.3 | 2.7 |
| (4) $0.6 < |f31/f3| < 1.5$ | 1.1 | 0.9 |
| (5) $4 < |f12/fw|$ | 4.6 | 35.1 |
| (6) $12 < v21 - v22$ | 25.7 | 14.0 |
| (7) $5 < |f32/fw|$ | 13.8 | 90.9 |

The above-mentioned zoom lenses according to the present invention can be used in electronic apparatuses of the type in which the zoom lenses are incorporated in the main bodies and which are provided with image pickup elements to capture images via the zoom lenses, for example, mobile telephones, digital still cameras, digital video cameras, mobile terminals (PDA), personal computers and pen-type cameras. The zoom lenses are suitable for use in small-sized electronic apparatuses in particular (mobile telephones and small-sized digital still cameras), and are capable of realizing image pickup using an optical zoom of approximately 2 to 3 times.

What is claimed is:

1. A zoom lens including, a negative first lens group which is fixed during power variations, a positive second lens group which moves from an image side toward the object side from the wide-angle end toward the telescopic end during power variations, and a negative third lens group which moves on the optical axis during power variations in this order from an object side, wherein;

the third lens group is made of a front group and a rear group with an air space interposed between the front group and the rear group; and when f1 denotes the focal length of the first lens group, f2 denotes the focal length of the second lens group, and y denotes the diagonal length of an image pickup plane, the following conditional Formulas are satisfied:

$1.3 < |f1/y| < 3.6$ $1.1 < f2/y < 2.0$

2. The zoom lens as cited in claim 1, wherein; when f3 denotes the focal length of the third lens group, the following conditional Formula is satisfied:

$1.6 < |f3/y| < 3.4$

3. The zoom lens as cited in claim 1, wherein; when f31 denotes the focal length of a lens positioned on the side closest to an object in the third lens group, the following conditional Formula is satisfied:

$0.6 < |f31/f3| < 1.5$

4. An electronic apparatus including a zoom lens and an imaging device for taking images through the zoom lens, wherein said zoom lens comprises:

a negative first lens group which is fixed during power variations;

a positive second lens group which moves from an image side toward the object side from the wide-angle end toward the telescopic end during power variations; and a negative third lens group which moves on the optical axis during power variations in this order from an object side, wherein;

the third lens group is made of a front group and a rear group with an air space interposed between the front group and the rear group; and when f1 denotes the focal length of the first lens group, f2 denotes the focal length of the second lens group, and y denotes the diagonal length of an image pickup plane, the following conditional Formulas are satisfied:

$1.3 < |f1/y| < 3.6$ $1.1 < f2/y < 2.0$

5. The electronic apparatus as cited in claim 4, wherein; when f3 denotes the focal length of the third lens group, the following conditional Formula is satisfied:

$1.6 < |f3/y| < 3.4$

6. The electronic apparatus as cited in claim 4, wherein; when f31 denotes the focal length of a lens positioned on the side closest to an object in the third lens group, the following conditional Formula is satisfied:

$0.6 < |f31/f3| < 1.5$

* * * * *